Patented Aug. 20, 1946

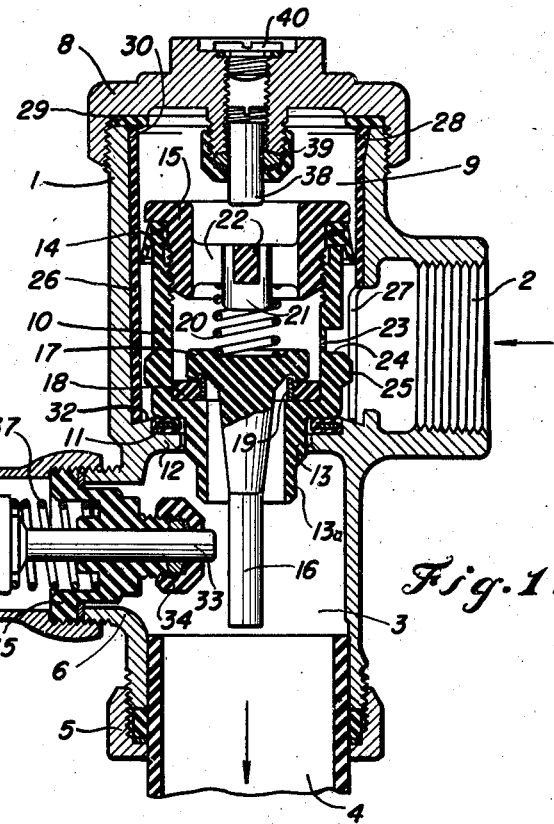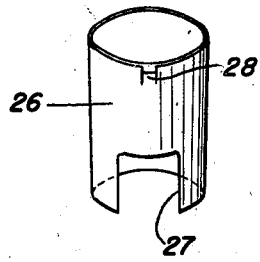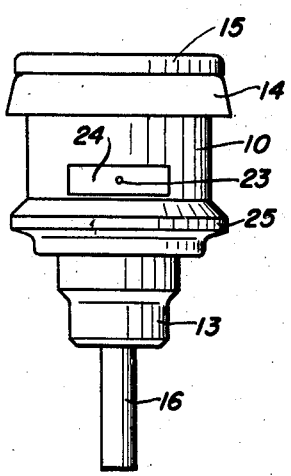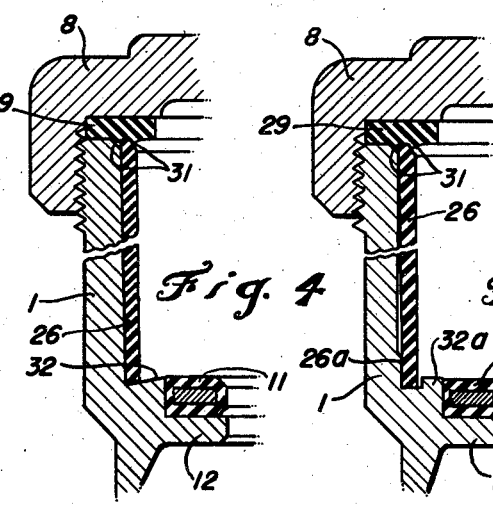

2,406,259

UNITED STATES PATENT OFFICE 2,406,259

FLUSH VALVE

Irving H. Russell, Oak Park, and Frederick C. Binnall, River Forest, Ill., assignors to Sloan Valve Company, Chicago, Ill., a corporation of Illinois Application May 10, 1943, Serial No. 486,280

2 Claims. (Cl. 137—93)

1

This invention relates in general to flush valves and has for its object to provide a new and improved type of flush valve, particularly for use in controlling the flow of water in water closets.

It is a primary object of the invention to provide a flush valve which is relatively inexpensive and economical to manufacture, and which is readily accessible for inspection or replacement of parts.

A further object of the invention is to design a flush valve which comprises relatively few and simple parts, facilitating ease of assembly, and which parts are made of materials precluding destructive corrosive action on the operating elements normally in direct contact with the water flowing through the valve.

A further object is to design a simplified one-piece piston body for a flush valve together with an improved by-pass and auxiliary valve therefor to provide improved operation of the flush valve.

Another object is to design a flush valve and a non-metallic lining therefor, whereby improved accuracy and more reliable operation of the piston over long periods of time are attained.

A further object is to provide improved sealing and holding means for a member lining the inside wall surface of a flush valve.

With the above and other objects in view which will appear as the nature of the invention is better understood, the same consists in the improved construction and novel arrangements of the parts of the flush valve, as will now be fully described and particularly pointed out in the claims hereto appended.

The accompanying drawing illustrates a form of the invention in which:

Fig. 1 is a vertical sectional view through a preferred form of the device embodying the invention;

Fig. 2 is a perspective view on a reduced scale of the tubular liner for the valve chamber;

Fig. 3 is a plan view of the piston assembly of the flush valve;

Fig. 4 is a view on an enlarged scale of a fragmentary portion of the valve assembly; and Fig. 5 is a similar view showing a modified construction.

As illustrated, the device comprises a cylindrical metal body portion or casing designated by the reference character 1 which is provided with a threaded water inlet opening 2 at one side thereof and an outlet or discharge opening 3 at the bottom end to which the tailpiece 4 is coupled by means of the slip joint and coupling nut 5 as shown. Another opening 6 is arranged in the lower body side for the accommodation of the operating handle 7 and its associated elements, while the top portion of the body is closed by the metal cover 8 externally threaded thereon.

The circular body portion 1 is hollowed out to provide a chamber 9, within which the one-piece piston 10 is slidably arranged. Piston 10 controls the flow of water through the chamber 9 by moving away from and upon the rubber valve seat 11 in turn arranged upon a shoulder 12 at the bottom end of the chamber 9. The piston 10 is provided at its lower end with a cylindrical restricted portion or refill head 13 formed integral therewith which is of such size and shape as to provide a refill supply of water for the water closet. A somewhat smaller restricted portion 13a, formed integral with the refill head, is arranged immediately below the head 13 and serves to control the rate of flow through the flush valve.

At its upper end, the piston 10 is provided with the usual rubber piston packing member 14 which divides the chamber 9 into an upper and lower portion. The packing member 14 is clamped directly to the end of the piston 10 by the flanged portion of the cap 15, the shank of which is threaded into the inside wall surface of the piston. An auxiliary valve member 16 having a small diameter lower stem portion and a larger head portion 17 on the other end is arranged to project through the axial opening in the bottom end of the piston 10, and is provided with a tapered shank portion having the larger end merging integral with the head 17 to provide reinforcement. The underside of the head 17 is provided with a sharp abutment as shown which is adapted to form good sealing engagement with the rubber valve seat 18 resting on a shoulder inside the hollow piston 10.

The rubber valve seat 18 has a metal ring 19 vulcanized to it which serves to maintain the auxiliary valve member properly centered upon the valve seat and also assists in guiding it into position. The upper surface of the auxiliary head 17 is recessed to retain one end of the coil spring 20, which normally urges the auxiliary valve 16 against the rubber valve seat 18 and assists in restoring it to the seat. The other end of the spring 20 is expanded over the lower end of a projection or abutment 21 which is formed at the junction point of a number of cross members 22 also formed integral with the cap 15 and which serve as reinforcement members for the same. At one point of the side wall of the piston 10 a small by-pass opening 23 is provided to permit water to pass to the inside of the piston 1 into the upper chamber of the valve. This by-pass opening 23 is arranged in a portion of the side wall of the piston where a slot 24 has been cut so that the length of the by-pass opening 23 is relatively short and there is less likelihood of the by-pass becoming clogged. Fig. 3 shows the by-pass 23 located at the mid-point of the slot 24 where the wall of the piston is reduced to the minimum thickness. With this arrangement the recessed slot 24 serves to protect and shield the by-pass opening 23 to a certain extent and no additional parts are required to form the by-pass, the simple drilled hole through the thin wall satisfactorily serving for the purpose. Around the lower outer diameter of the piston 10 there is arranged an annular guiding ledge 25 formed integral with the piston body and which serves to guide the piston in its up and down movement in the chamber 9.

It has been customary to construct the piston body 10 of brass or other metal that required the accurate machining of the several elements comprising the piston and which were secured together by screwing the parts onto one another. This increased manufacturing cost of the piston, as well as required additional time consumed in assembling the various elements. The piston 10 according to the present invention is constructed of a single piece preferably of a non-metallic substance such as any of the well known plastic materials now commercially available upon the market. This plastic material either thermo setting or thermo plastic, exhibits characteristics which are ideally suited for the purpose of making pistons. Examples of such materials suitable for this purpose are butyrate, polystyrene, vinylite, phenolic resin, etc. When formed of plastic material, the piston is cheaply made into a single unitary part, is light in weight and has the requisite strength to withstand the water pressures encountered. The most important characteristic is its non-corrosive and rust-proof qualities as well as its tendency to remain free from the usual accumulation of sediment as encountered in metal parts. These desirable characteristics insure that the parts continually remain in good free operating condition, reducing maintenance and repair and securing reliable functioning under all adverse conditions to which the flush valve be subjected. In addition to the piston body 10, the cap piece 15 and the auxiliary valve member 16 are also formed of plastic material and exhibit similar characteristics.

By the use of the term "plastic" in this specification and the appended claims, it is not intended that any specific type of non-metallic material be defined as desirable but only that the expression be utilized in a generic sense to include any or all thermo-setting or thermo-plastic materials now commercially available and which could be readily formed into the desired shapes and fulfill the qualities necessary in flush valve operation.

So that the piston 10 may function in a reliable manner, its piston packing 14 must have a very smooth wall surface for it to slide upon. This wall surface must be free from any machine marks, nicks or scratches, so that no frictional resistance is encountered to hamper the free movement of the piston. To provide such a smooth sliding surface for the piston packing, a special lining is arranged to cover the inside wall surface of the valve body 1. This lining may take the form of a tubular or cylindrical member 26 which is made of plastic material to provide a smooth clean surface that will not rust and corrode and is not subject to chemical action by the water. The lining 26 is slightly tapered with its smaller diameter at the bottom end, as seen in Fig. 2, whereby its insertion into the body 1 (also tapered), is facilitated, and a closer fit is provided. At the lower end, the lining 26 has an opening or notch 27 cut into it to fit over the inlet opening 2 and permit ingress of the water to the valve. A small projecting lug 28 on the upper edge of lining 26 fits into a small slot in the body wall 1, as shown in Fig. 1, and thereby prevents axial rotation of the lining 26 to insure that the slot 27 remains in alignment with the inlet opening 2 at all times.

At the upper end of the valve body 1, the liner 26 and the body have their edges sealed by means of the rubber gasket 29, clamped tightly down over the ends by the cover 8. To insure more effective sealing, the edge of the liner 26 is beveled as shown at 30 and a similar bevel is formed on the inside edge of the body 1. This beveling enables the rubber gasket 29 to be squeezed or forced down over the beveled sections, as indicated at 31 in Figs. 4 and 5. This method of sealing effectively prevents leakage of water (which may be under a pressure upwards to 100 lbs. per square inch) from the inside of the chamber 9 to the outside of the valve. A second important function of this sealing method is that it also prevents leakage of water passing from the lower end of the liner and body, via the adjoining walls thereof and into the upper chamber on the topside of the piston 10. Should such leakage occur, the action of the by-pass 23 would be nullified and the valve would fail to operate properly.

The plastic lining 26 being a relatively thin-walled semi-rigid structure, could conceivably become warped or be bent inward at its ends when subjected to extreme or adverse operating conditions. This is prevented at the upper end of the lining by the rubber gasket 29 being firmly imbedded in the beveled edge 30 and holding the lining rigidly in place so it cannot bend. At its lower end the lining 26 is forced against a shoulder or ledge 32 formed in the body 1 adjacent the rubber valve seat 11. This shoulder 32 is formed at an angle as more clearly seen in Fig. 4, and serves to prevent inward warping or curling of the liner 26 at its lower end. By firmly holding the liner in position in the foregoing manner, it cannot become dislodged or shifted whenever the piston operates or the auxiliary valve 16 receives a thrust to initiate the flush valve operation.

A plunger 33 slidably arranged through the packing nut 34 and the bushing 35 is adapted to engage the lower end of the auxiliary valve 16 to trip the same. This plunger 33 is actuated by the operating handle 7 and the complete assembly is held in position on the body 1 by the socket 37 threaded onto the opening 6 in the body. Spring 37 supplies the restoring force for the plunger 33 and the handle 7. The handle 7, plunger 33, packing nut 34, and bushing 35, are each made of a plastic material in order to insure continuous free and smooth operation of the parts and also to prevent corrosion and accumulation of foreign deposits upon the parts.

In order to limit the stroke of the piston and thereby control the volume of water passed by each operation of the flush valve, an adjustable bumper pin 38 is threaded through the cover 8 and is adapted to be engaged by the abutment 21 in the cap 15 formed at the junction point of the cross-pieces 22. The bumper 38 also passes through the packing and nut 39, and the threaded opening in the cover 8 is closed by the small cap screw 40.

Referring to Fig. 4 it will be noted that the adjoining walls of the lining 26 and the body 1 are both tapered as in Fig. 1, thereby providing a relatively close intimate fit between them. This, however, is somewhat difficult to achieve due to the fact that the machining of the body cannot be made to a high degree of accuracy. An alternative arrangement is shown in the modification Fig. 5 in which the tubular lining 26 is tapered as before, but the body walls are provided at the lower end with a small offset shoulder 26a. The body walls can consequently be machined straight or vertically and the liner 26 held rigidly in position. Instead of an inclined shoulder 32 as in Fig. 4, a projecting ridge 32a may serve to prevent warping of the lower edge of lining 26.

The use and operation of the flush valve disclosed and the advantages attained are as follows:

When the flush valve is in use, the parts are in the position as shown in Fig. 1, with the inlet water pressure exerting itself in the upper chamber 9 on top of the piston 10 after passing through the by-pass opening 23, thereby forcing the piston against valve seat 11 and auxiliary valve 16 against valve seat 18. To operate the flush valve, the handle 7 is actuated causing the plunger 33 to engage the auxiliary valve stem 16 thereby tripping the same off its seat. This permits the water in chamber 9 on top of the piston to escape through the axial opening in the piston and into the discharge opening 3, thereby lowering the pressure in the chamber 9. The pressure of the water from inlet 2 is now effective to act upon the piston and cause it to rise from its valve seat 11 and permit the water to pass from the inlet 2 to the discharge outlet 3 and the tail piece 4. The upward movement of the piston is halted by the abutment 21 striking the bumper pin 38.

When the piston reaches the limit of its upward movement and the handle is released, the plunger 34 is withdrawn by the spring 37 while the spring 20 assisted by gravity closes the auxiliary valve head 17 upon valve seat 18. The water passing from the inlet 2 through the by-pass 23 builds up the pressure on top of the piston, thereby causing the piston to move down upon the main valve seat 11 shutting off the flow of water through the valve.

As the piston moves down upon its seat 11, the refill head 13 enters the axial opening defined by shoulder 12 restricting the flow so as to provide the proper amount of refill water to the water closet with which this flush valve is associated. The barrel portion 13a in the upper position of the piston is at that time within the axial opening and thereby restricts the water flow to the desired rate of flow through the valve.

It will be noted that all of the working parts of the valve and the elements they are associated with or come in contact with, are made of plastic material, thereby providing smooth clean surfaces which are immune to corrosion, rust, and the deposition of foreign matter. The parts thereby constantly coact in a positive manner insuring accurate and reliable operation of the flush valve for the full period of its use without repair or maintenance. Other advantages accruing from the use of the plastic material are the long life of the relatively few parts when in constant contact with water and their light weight when compared to metal, thereby providing for better operation on low water pressures. Economies are also effected by the low cost of the plastic material and the savings effected in shipping the light-weight valves. The most important advantage resides in the manufacturing costs and time saved in producing the various articles, most of which are in mass production by simple extrusion or molding processes.

What is claimed is:

1. The combination of a cylindrical lining member and a flush valve body in which said lining member is inserted, said flush valve having an inlet opening therein, said lining member comprising a body portion subject to warping and having a slotted opening at one end thereof arranged for alignment with the inlet opening of the flush valve, and means at the other end of said lining member for maintaining said openings in alignment, said lining member having slightly tapered walls to facilitate insertion in said flush valve, and cooperating means on the flush valve and lining member for preventing warping of one of the ends of said lining member.

2. In a flush valve comprising a metallic casing having a large opening at one end and a water inlet opening at the side thereof, a plastic cylindrical member serving as a lining for said casing and inserted from the large open end thereof, said cylindrical member and said casing walls being slightly tapered to facilitate insertion of the cylindrical member in the casing and provide a close fit between the walls thereof, said cylindrical member having a slotted opening arranged for alignment with the water inlet opening of the casing means for closing the large open end of said casing and one end of said cylindrical member to prevent inward warping of said cylindrical member, and means at the other end of said cylindrical member for preventing warping at that end, and cooperative means on the cylindrical member and casing for maintaining the slotted opening of the cylindrical member and the water inlet opening in the casing in alignment.

IRVING H. RUSSELL.
FREDERICK C. BINNALL.